INVENTORS R. R. STOKES
R. E. WADDELL
BY Harry L. Newman
ATTORNEY

Feb. 11, 1969 R. R. STOKES ET AL 3,427,403

AUTOMATIC REPORTING TELEPHONE WITH MESSAGE TRANSMISSION RESPONSIVE TO IDENTIFICATION REQUEST SIGNAL RESPONSES

Filed Dec. 22, 1964

United States Patent Office 3,427,403

Patented Feb. 11, 1969

3,427,403

AUTOMATIC REPORTING TELEPHONE WITH MESSAGE TRANSMISSION RESPONSIVE TO IDENTIFICATION REQUEST SIGNAL RESPONSES

Rembert R. Stokes and Richard E. Waddell, Indianapolis, Ind., assignors to Bell Telephone Laboratories, Incorporated, New York, N.Y., a corporation of New York Filed Dec. 22, 1964, Ser. No. 420,416

U.S. Cl. 179—5 10 Claims

Int. Cl. H04m *11/04*

ABSTRACT OF THE DISCLOSURE

An apparatus for reporting alarm conditions at an unattended location includes motor driven printed circuit discs for providing switching logic, an automatic dialer for calling a preselected station, a transmitter for transmitting a coded audible signal to the called station, a filter and bistable multivibrator for receiving and responding to an audible signal from the called station, and a magnetic tape and record-reproduce circuit for transmitting a prerecorded message to the called station. The apparatus is powered by a battery that is charged from the telephone line.

This invention relates to automatic alarm devices and particularly to such devices that operate in conjunction with a conventional automatic telephone system.

In recent years, it has become increasingly common for unattended equipment to automatically perform a variety of functions at remote locations. Typical examples include electrical switching at power substations and valve regulation at pipeline control stations. However, with unattended equipment at a remote location there is the problem of how to know when a malfunction or failure of the equipment occurs. It is uneconomic to employ personnel to maintain a full time vigilance for the rare occasions when their services would be needed. Yet, on the other hand, the consequences of not quickly finding out that a malfunction or failure has occurred may be severe. Thus the need has arisen for a device that in response to such an occurrence reports appropriate information to a supervisory station.

It is possible to provide private communication means between each remote location and the supervisory station, but the occasional use that would be made of this private means does not justify the expenditure that it would entail. A more reasonable solution is to take advantage of the public communication facilities offered by the local telephone system. Telephone lines connecting the remote location to a superivsory station may be leased full time, or each remote location and the supervisory station may be treated as an ordinary subscriber with connections being made therebetween by means of the switching equipment of a central office. The former offers the advantages of assuring access between the remote locations and the supervisory station, but its cost is high. The latter is quite inexpensive, but it involves the risk that the circuits may be unavailable when the reporting device at the remote location tries to reach the supervisory station.

An object of this invention is to provide an automatic reporting device that operates in conjunction with a conventional automatic telephone system.

Specifically, an object of this invention is to provide an automatic reporting device that is adapted to utilize the regular single party subscriber service of a telephone system and maximize the probability of successfully reporting to the supervisory station.

These and other objects of this invention are achieved in an automatic reporting telephone that upon the occurrence of a predetermined condition seizes a telephone line, delays for a dial tone, and transmits pulses corresponding to a preselected number. Upon completing the transmission of the pulses, the automatic reporting telephone delays to permit a monitor at the called station to answer, and then transmits a coded identification request signal consisting of alternate intervals of sound and silence. If the automatic reporting telephone receives the proper response signal to the identification request signal, that is, if the monitor responds, such as by talking loudly or dialing a digit, during particular ones of the silent intervals, the automatic reporting telephone is caused to transmit a recorded voice message apprising the montor to the location of the automatic reporting telephone and of the occurrence of the predetermined condition.

Should the automatic reporting telephone fail to receive the proper response signal to the identification request signal, which will occur if the line is busy, the monitor at the called station does not answer, or a wrong number is reached, the automatic reporting telephone drops the line, and after a delay of several minutes re-initiates the call. If necessary, a total of seven attempts are made over a thirty minute period to reach the preselected station.

Upon receiving the correct response signal to the identification request signal, the automatic reporting telephone transmits the recorded message twice and then again transmits the identification request signal. Should the monitor wish to have the recorded message repeated further, he again responds during the proper silent intervals, and the recorded message is transmitted two more times. Otherwise, the automatic reporting telephone, failing to receive the proper response signal, drops the line and returns to its initial state of readiness.

Because in the usual case the automatic reporting telephone operates infrequently, it is designed to permit the monitor to check on its operability from his distant station. To this end, the automatic reporting telephone answers an incoming call and transmits the identification request signal. If the automatic reporting telephone receives the proper response signal to the identification request signal, it is caused to perform in substantially the same manner as if the predetermined condition had occurred. Thus after the monitor gives the proper response signal to the identification request signal, he hangs up, and if the automatic reporting telephone is operating properly, it proceeds to initiate a call in the aforedescribed manner.

A feature of this invention resides in the employment of a coded identification request signal to which a called party must provide the proper response signal in order to initiate the transmission and repetition of the recorded message and to which a calling party must provide the proper response signal in order to initiate the complete operation of the automatic reporting telephone. In the first instance, the required response signal informs the automatic reporting telephone whether or not a monitor has in fact been reached and assures that the message is only transmitted to the monitor. In the second instance, the required response signal assures that only the monitor is able to initiate the check on the operability of the automatic reporting telephone. In both instances, the response signal required of the monitor may be produced by speaking loudly or by operating the dial on his telephone set. No supplementary signaling apparatus is needed at the monitor station. Hence, the monitor's station may be changed to suit his needs.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purpose of illustration and description and is not to be construed as defining the limits of the invention.

In the drawing:

FIG. 1 is a schematic drawing showing the mechanical aspects of the automatic reporting telephone of this invention;

FIGS. 2, 3, and 4 are plan views of the three programmed members that provide the switching logic for the automatic reporting telephone;

*Mechanical description*

Figure 1:
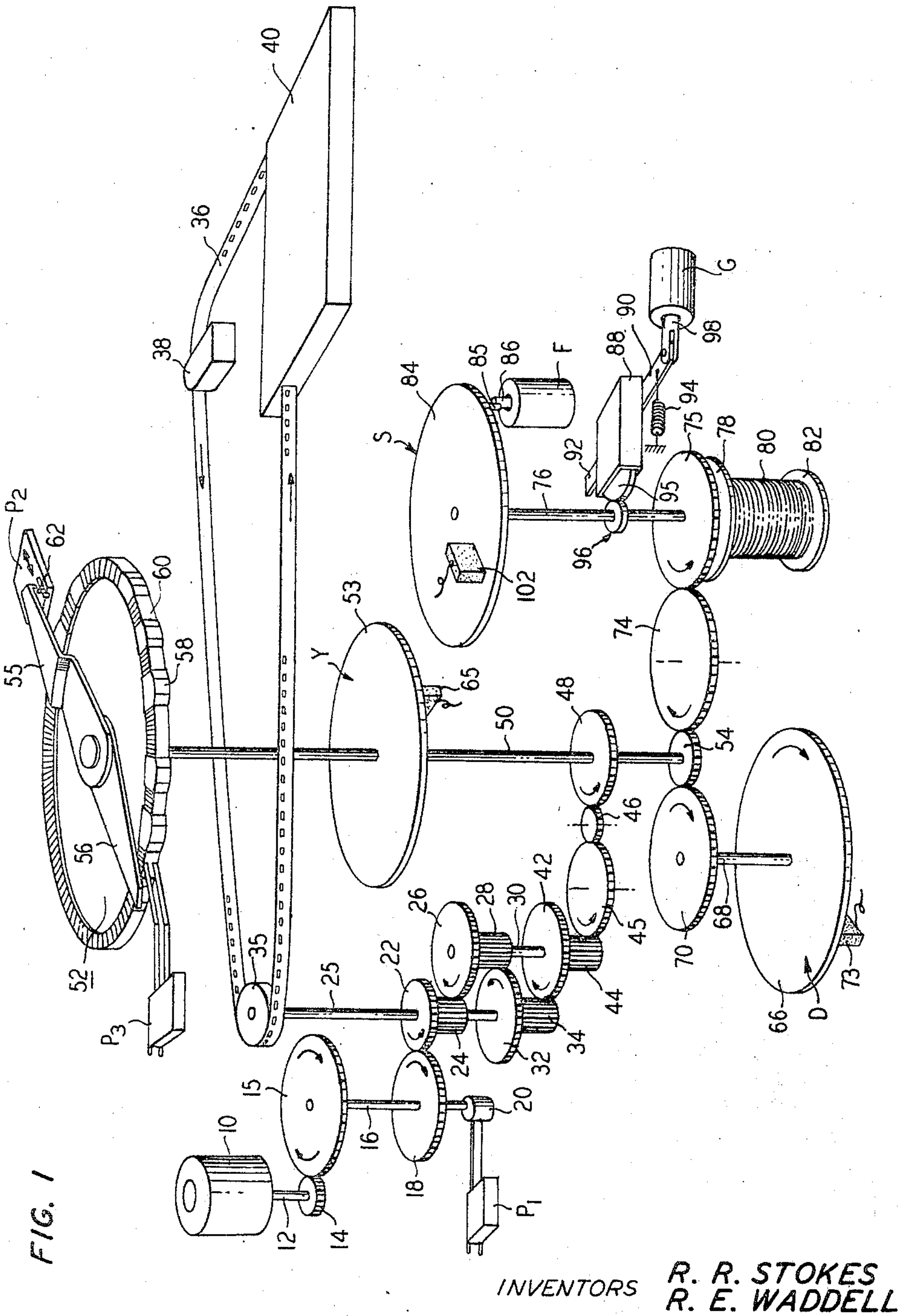

Referring to the drawing and FIG. 1 in particular, the automatic reporting telephone includes a direct current motor 10 having a shaft 12 on which is affixed a pinion 14. The pinion 14 meshes with a gear 15 fixedly mounted on a rotatable shaft 16, the shaft also having a gear 18 and a pulsing cam 20 fixedly mounted thereon. A pulsing switch $P_1$ has a pair of normally closed contacts extending into juxtaposition with the pulsing cam 20, and the cam is shaped so that during a portion of each revolution thereof the contacts are opened once. Advantageously, the pulsing cam and contact arrangement employed is the same as that disclosed in Patent 2,963,554 issued to H. J. Hershey on Dec. 6, 1960.

As hereinafter disclosed, each opening of the normally closed pulsing contacts $P_1$ acts to interrupt a telephone line and thereby transmit a direct current pulse thereover, and since the pulsing rate generally employed in telephone systems is ten pulses per second, the pulsing cam 20 must rotate at ten revolutions per second, or in other words, at six hundred revolutions per minute. Consequently, the rotational speed of the shaft 12 of the motor 10 and the number of teeth on the pinion 14 and gear 15 are selected to provide the shaft 16 with a rotational speed of six hundred revolutions per minute. Furthermore, as the pulsing rate is generally limited to a plus or minus five percent tolerance, the motor 10 is selected to have speed regulation characteristics within this tolerance under the anticipated variations in voltage and load.

The gear 18 on the shaft 16 drives a gear 22 that is coaxial with and positively coupled to a pinion 24, the gear 22 and pinion 24 being rotatively mounted on a rotatable shaft 25; the pinion 24 in turn drives a gear 26 that is coaxial with and positively coupled to a pinion 28, the gear 26 and pinion 28 being rotatively mounted on a rotatable shaft 30; and the pinion 28 in turn drives a gear 32 that is coaxial with and positively coupled to a pinion 34. The gear 32 and the pinion 34 are fixedly mounted on the shaft 25 along with a sprocket wheel 35.

The sprocket wheel 35 drives a magnetic recording tape 36, the teeth on the sprocket wheel engaging spaced holes in the tape. The tape 36 is a continuous loop and therefore no rewinding is necessary and the sprocket wheel 35 need turn in only one direction. In addition, over the entire length of the loop, the tape 36 is held in tension only between the sprocket wheel 35 and a record and reproduce head 38, the tape being held against the head by a pressure pad (not shown). The torque loading on the sprocket wheel 35 is thereby held to a minimum.

A voice message to be transmitted by the automatic reporting telephone is recorded on the tape 36, and the length of the tape and the speed of rotation of the sprocket wheel 35 are selected to provide a message time of a minimum of fifteen seconds. In one specific embodiment of the invention, which is the embodiment that will be referred to throughout the detailed description, the sprocket wheel 35 rotates at 57.5 revolutions per minute to provide a tape speed of 2.3 inches per second, and the length of the tape loop is 39.6 inches to provide a message time of 17.2 seconds. Advantageously, a portion of the length of the tape 36 is taken up in a tape magazine 40 in which the tape is generally unrestrained and assumes a configuration in which no two oxide surfaces touch each other.

The pinion 34 drives a gear 42 that is coaxial with and fixedly coupled to a pinion 44, the gear 42 and pinion 44 being mounted on the shaft 30. The pinion 44 in turn drives a gear 45 that acts through an idler 46 to drive a gear 48 fixedly mounted on a rotatable shaft 50. In addition to the gear 48, the shaft 50 has a number selecting member 52, a programmed member 53, and a pinion 54 fixedly mounted thereon.

The number selecting member 52 in combination with an initiating arm 55, a terminating arm 56, and a plurality of interdigital clips 58 provide the means by which a telephone number to be called by the automatic reporting telephone is preselected, and these elements interact with the pulsing switch $P_1$, an initiating and terminating switch $P_2$, and an interdigital switch $P_3$ to transmit the telephone number.

The number selecting member 52 includes a rim 60, and the initiating and terminating switch $P_2$ is positioned adjacent thereto. The initiating and terminating switch $P_2$ comprises a make-before-break transfer switch including a pair of normally closed contacts and a pair of normally open contacts, and advantageously the switch is similar to that disclosed in the application of A. J. Chase and H. J. Hershey, Ser. No. 150,716, filed Nov. 7, 1961, now U.S. Patent No. 3,202,774 and assigned to the assignee of this invention, in that it is operated by the rectilinear displacement of a pin, the pin being indicated in FIG. 1 by the reference character 62. When the pin 62 is in a rearward position, rearward being toward the top of FIG. 1, the contacts are in their normal condition, and when the pin is in its forward position, the normally closed contacts are open and the normally open contacts are closed.

The pin 62 is displaced between its rearward and forward positions by the initiating arm 55 and the terminating arm 56, the arms extending radially from the center of the number selecting member 52 beyond the rim 60. The initiating and terminating arms 55 and 56 are secured to the number selecting member 52 so as to rotate therewith but the position of the terminating arm is adjustable to vary the angle included between it and the initiating arm. The initiating arm 55 has a depending flange at the outer end theerof that extends at an angle to the longitudinal axis thereof such that the left side of the flange, when viewed from the center of the number selecting member 52, is a greater distance from the center of the number selecting member than the right side of the flange. As shown in FIG. 1, the number selecting member 52 rotates in a counterclockwise direction, and the flange is adapted to engage the pin 62 and displace it from its rearward position to its forward position. Conversely, the terminating arm 56 has an edge at the outer end thereof that extends at an angle to the longitudinal axis thereof such that the right side of the edge, when viewed from the center of the number selecting member 52, is a greater distance from the center of the number selecting member than the left side of the edge. As the number selecting member 52 rotates, this edge is adapted to engage the pin 62 and displace it from its forward position to its rearward position.

The normally closed contacts of the initiating and terminating switch $P_2$ are connected in parallel with the normally closed pulsing contact $P_1$ and hence prior to the actuation of the pin 62 by the initiating arm 55 and subsequent to the actuation of the pin by the terminating arm 56, a shunt path is provided around the pulsing contacts and the opening thereof cannot interrupt the telephone line.

The plurality of interdigital clips 58 are positioned on the rim 60 of the number selecting member 52 between the trailing edge of the initiating arm 55 and the forward edge of the terminating arm 56. The interdigital clips 58 are arcuate in shape and closely embrace the rim 60, and they are movable along the length of the rim. One side of the rim 60 has a plurality of equally sized teeth that are equally spaced around the entire length thereof, and the teeth cooperate with the interdigital clips 58 to locate the clips in particular spaced positions on the rim.

The interdigital switch $P_3$ is positioned in juxtaposition with the rim 60 of the number selecting member 52 and has a pair of contacts that are spaced from and electrically insulated from one another and are biased toward the peripheral surface of the rim. The peripheral surface of the rim 60 is electrically nonconducting, and thus when the interdigital contacts $P_3$ are in engagement with the peripheral surface, they are open. The interdigital clips 58, however, are electrically conducting, and hence when the interdigital contacts $P_3$ are in engagement with one of the interdigital clips, a conductive path is provided between the contacts and they are closed.

The interdigital contacts $P_3$ are also connected in parallel with the pulsing contacts $P_1$, and thus when the interdigital contacts are in engagement with the interdigital clips 58, a shunt path is provided around the pulsing contacts, and the opening thereof cannot interrupt the telephone line. When, on the other hand, the interdigital contacts $P_3$ are in engagement with the peripheral surface of the rim 60 of the number selecting member 52, the shunt path is open and each opening of the pulsing contacts $P_1$ acts to interrupt the telephone line. The pulsing contacts $P_1$ are opened once for each revolution of the pulsing cam 20 and advantageously the size and the spacing of the teeth on the number selecting member 52 are such and the gearing joining the gear 18 with the gear 48 is such that the number selecting member rotates through the distance of one tooth thereon for each revolution of the pulsing cam 20. Hence each tooth on the number selecting member 52 represents one pulse interval. In the specific embodiment, the number selecting member 52 rotates 3.49 revolutions per minute or one revolution every 17.2 seconds, and has one hundred seventy-two teeth. The one hundred seventy-two pulse intervals permit the calling of a telephone number up to and including fourteen digits in length.

To preselect a telephone number, a first interdigital clip 58 is positioned on the rim 60 of the number selecting member 52 so as to extend slightly beyond the trailing edge of the initiating arm 55, and a second interdigital clip is spaced from the first interdigital clip in a clockwise direction a number of pulse intervals equal to the first digit of the telephone number. A third interdigital clip 58 is spaced from the second interdigital clip a number of pulse intervals equal to the second digit, a fourth interdigital clip is spaced from the third interdigital clip a number of pulse intervals equal to the third digit, and so on. The terminating arm 56 is then positioned over the second of the two interdigital clips 58 defining the last digit of the telephone number to prevent pulsing of the telephone line subsequent to the transmission of the last digit.

Thus, in the specific embodiment, to preselect the telephone number 582–2911, the first and second interdigital clips 58 are spaced five teeth apart, the second and third interdigital clips are spaced eight teeth apart, the third and fourth and the fourth and fifth interdigital clips are spaced two teeth apart, the fifth and sixth interdigital clips are spaced nine teeth apart, and the sixth and seventh and the seventh and eighth interdigital clips are spaced one tooth apart. The terminating arm 56 is positioned over the eighth interdigital clip 58.

Advantageously, the interdigital clips 58 are each of a length corresponding to six pulse intervals to thereby provide the standard interdigital time period of 0.6 second. Accordingly, in the specific embodiment, the interdigital clips 58 are equal in length to six teeth on the number selecting member 52.

The programmed member 53 is mounted on the shaft 50 with the number selecting member 52 and therefore rotates at the same speed thereas which, in the specific embodiment, is 17.2 seconds per revolution. Thus, the number selecting member 52 and the programmed member 53 rotates through one complete revolution in the same time that it takes the tape loop 36 to make one complete revolution.

Figure 2:
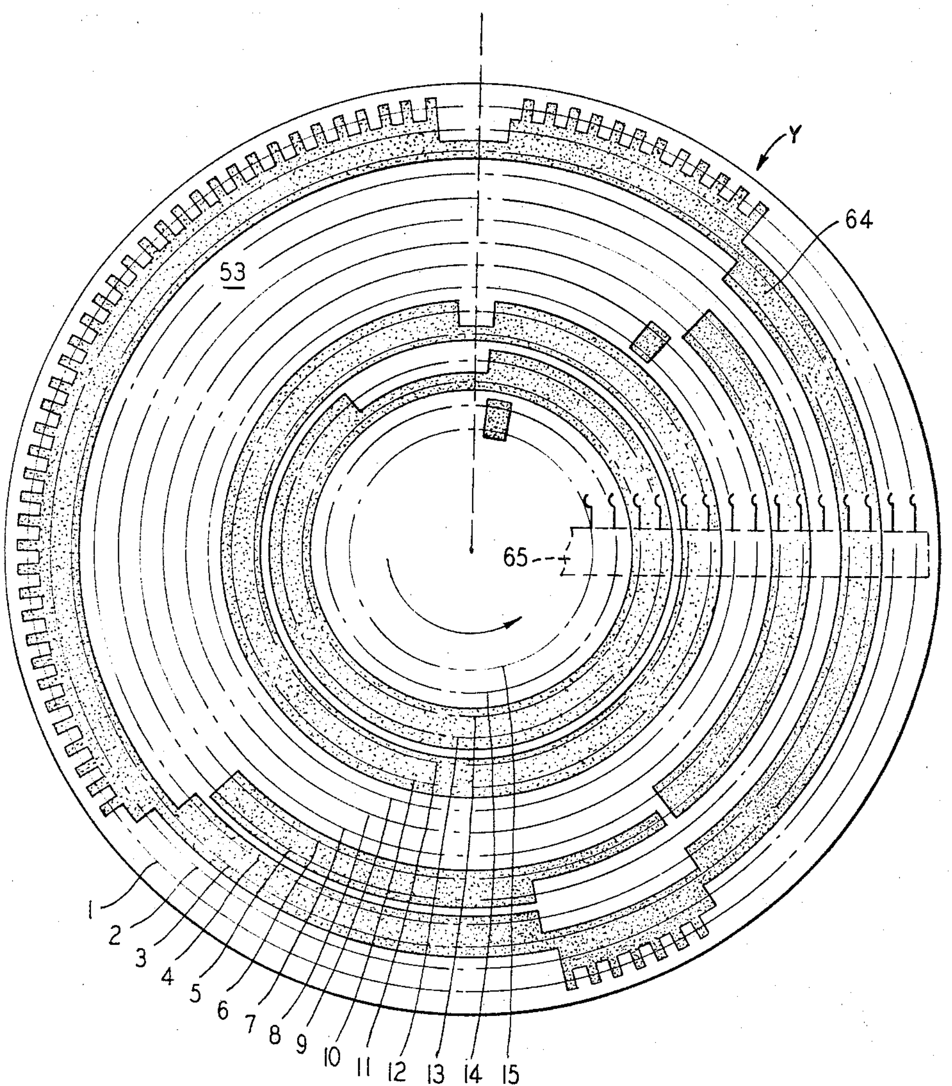

Referring to FIGS. 1 and 2, the programmed member 53 comprises a dielectric disc having a particular conductive pattern 64 printed on the undersurface thereof. A row of fifteen contact members extends into engagement with the undersurface of the programmed member 53, and the contact members are mounted in a holder 65 so as to be spaced along a radius of the programmed member and insulated from one another.

As the programmed member 53 rotates, the programmed member rotating in a clockwise direction with respect to the contact members, the contact members describe a grid of fifteen concentric circles on the undersurface of the programmed member. This grid is shown in FIG. 2 with a reference character assigned to each circle to indicate the number of particular contact members that describes that circle. It is seen from this grid that during each revolution of the programmed member 53, some adjacent pairs of contact members are at times in engagement with common portions of the conductive pattern 64.

When an adjacent pair of contact members are in engagement with a common portion of the conductive pattern 64, they are interconnected thereby and may be properly referred to as a pair of closed contacts. When, on the other hand, one or both of this pair of adjacent contact members are not in engagement with a common portion of the conductive pattern 64, in which case one or both of the contact members are in engagement with the dielectric surface of the programmed member 53, the contact members are not interconnected and may be properly referred to as a pair of open contacts.

From a close examination of FIG. 2, it is seen that the contact members interact with the programmed member 53 to provide nine pairs of programmed or sequentially actuated contacts. These nine pairs of programmed contacts comprise a programmed or sequentially actuated switching means Y, and the pairs of contacts are identified as $Y_{1-2}$, $Y_{2-3}$, $Y_{3-4}$, $Y_{5-6}$, $Y_{6-7}$, $Y_{8-9}$, $Y_{10-11}$, $Y_{12-13}$, and $Y_{14-15}$, the subscripts indicating the particular contact members and portions of the programmed member 53 comprising the pairs of contacts. The pairs of programmed contacts are referred to as normally open or normally closed depending upon the condition they are in when the programmed member 53 is in a rest position, the rest position being indicated in FIG. 2 by a dashed radial line. It is seen from the figure that all of the programmed Y contacts are normally open.

Figure 3:
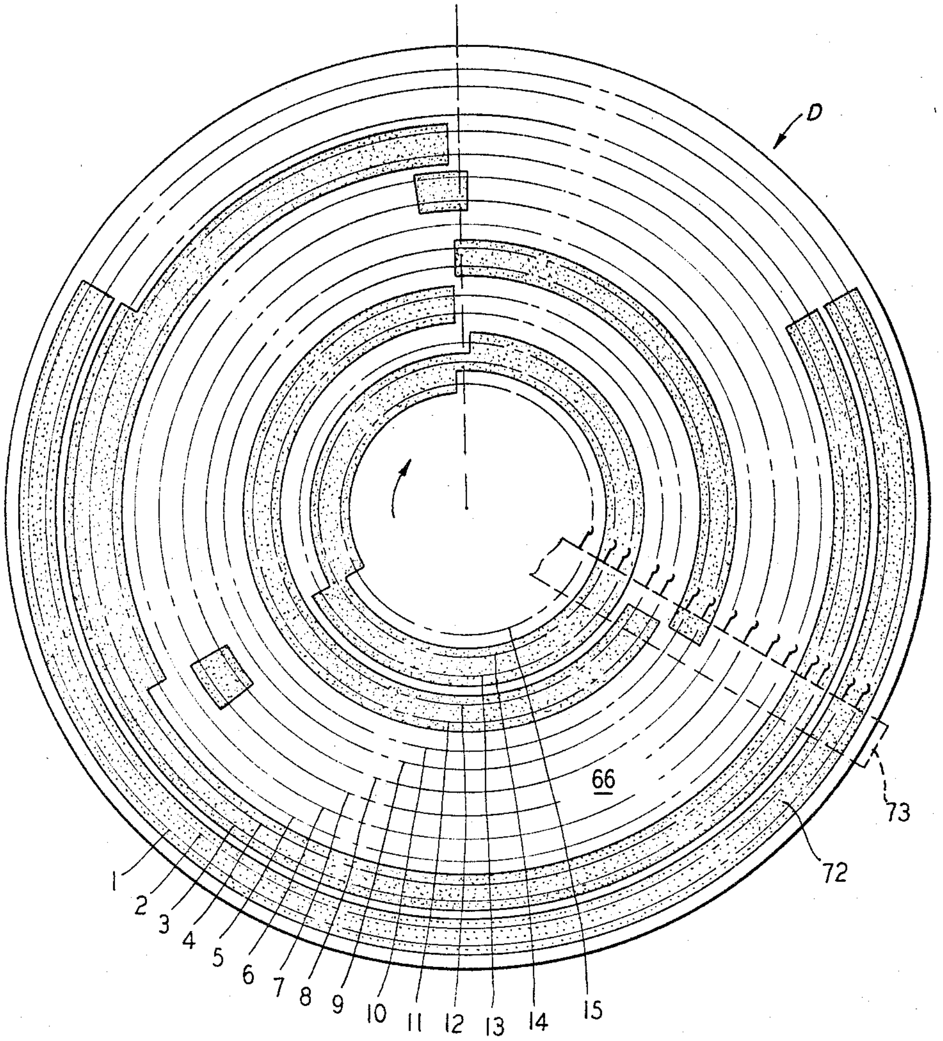

Somewhat similar to the programmed switching means Y is a programmed or sequentially actuated switching means D which includes a programmed member 66 that is fixedly mounted on a rotatable shaft 68 along with a gear 70, the gear being driven by the pinion 54. Referring to FIGS. 1 and 3, the programmed member 66 comprises a dielectric disc having a particular conductive pattern 72 printed on the undersurface thereof, and a row of fifteen contact members extended into engagement therewith. The contact members are spaced along a radius of the programmed member 66 and are mounted in a holder 73 so as to be insulated from one another.

The paths described by the contact members as the programmed member 66 rotates are shown in FIG. 3 as a grid of fifteen concentric circles superimposed upon the programmed member 66, and the reference character assigned to each circle indicates the number of the particular contact member that describes that circle. The contact members interact with the programmed member 66 to provide nine pairs of programmed or sequentially actuated contacts. These pairs of programmed contacts are identified as $D_{1-2}$, $D_{3-4}$, $D_{4-5}$, $D_{6-7}$, $D_{7-8}$, $D_{9-10}$, $D_{11-12}$, $D_{13-14}$, and $D_{14-15}$, the subscripts indicating the particular contact members and portions of programmed member 66 involved. As seen by the dashed radial line indicating the rest position of the programmed member 66, the programmed contacts $D_{6-7}$ and $D_{9-10}$ are normally closed, while all the rest are normally open.

The gear ratio between the gear 70 and the pinion 54 is such that the programmed member 66 rotates one-third as fast as the programmed member 53. Thus, in the specific embodiment, the programmed member 66 rotates at 1.162 revolutions per minute or 51.6 seconds per revolution.

The pinion 54, besides driving the gear 70 also drives a gear 74 that in turn drives a gear 75, the gear 75 being driven in a counterclockwise direction. The gear 75 is rotatably mounted on a shaft 76, and a disc type slip clutch 78 that is also rotatably mounted on the shaft 76 couples the gear 75 to a motor spring 80. One end of the motor spring 80 is secured to the slip clutch 78, while the other end of the motor spring is secured to a disc 82 fixedly mounted on the shaft 76.

As the gear 75 rotates in a counterclockwise direction, it tends to rotate the slip clutch 78 in a counterclockwise direction, and the slip clutch in turn tends to rotate the end of the motor spring 80 to which it is secured in a counterclockwise direction. The motor spring 80, however, tends to rotate the slip clutch 78 in a clockwise direction, and when the clockwise force exerted by the motor spring 80 on the slip clutch becomes equal to the counterclockwise force exerted by the gear 75 on the slip clutch, the gear 75 commences to move relative to the slip clutch.

The motor spring 80 also tends to rotate the disc 82 and thereby the shaft 76 in a counterclockwise direction. The shaft 76, however, is not normally able to rotate freely. A programmed member 84 fixedly mounted on the shaft 76 has a finger 85 depending therefrom, and an armature 86 of a start solenoid F extends into the path of the finger. Hence when the finger 85 is in engagement with the armature 86, the rotation of the programmed member 84 and thereby the shaft 76 is prevented. Furthermore, when the solenoid F is energized to move the armature 86 from the path of the finger 85, the rate of rotation of the shaft 76 is limited by a clock escapement 88.

The clock escapement 88 is mounted on a lever 90 one end of which pivots about a pin 92, and a spring 94 biases the lever 90 so as to move a gear 95 of the clock escapement into engagement with a pinion 96 fixedly mounted on the shaft 76. Thus the clock escapement normally determines the rotational speed of the shaft 76. In the specific embodiment, the clock escapement 88 acting through the gear 95 and pinion 96 limits the rotation of the shaft 76 and thereby the programmed member 84 to one revolution per thirty minutes.

The end of the lever 90 opposite to the pin 92 is secured to an armature 98 of a release solenoid G, and when the release solenoid G is energized, the clock escapement 88 is withdrawn from the pinion 96. The shaft 76 is then free to rotate, and the motor spring 80 acts on the disc 82 to rotate the shaft until its motion is arrested by the engagement of the finger 85 with the armature 86 of the start solenoid F.

Figure 4:
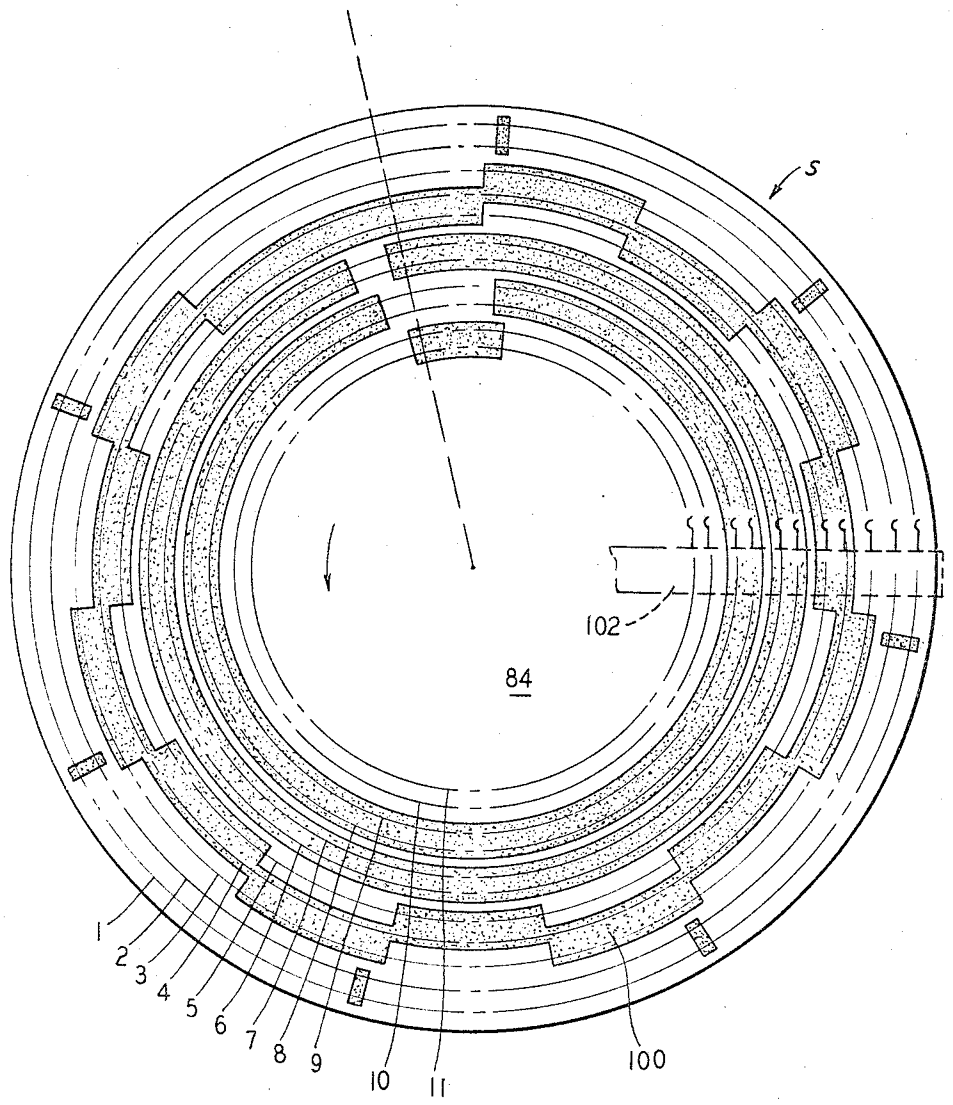

Referring to FIGS. 1 and 4, the programmed member 84 like the programmed members 53 and 66, comprises a dielectric disc having a particular conductive pattern 100 printed on the upper surface thereof. A row of eleven contact members, which are mounted in a holder 102 so as to be insulated from one another, are spaced along a radius of the programmed member 84 and extend into engagement with the upper surface thereof. As the programmed member 84 rotates, the contact members describe a grid of concentric circles, which grid is shown in FIG. 4 with a reference character assigned to each circle to indicate the particular contact member that describes that circle.

The contact members interact with the programmed member 84 to provide a programmed or sequentially actuated switching means S having six pairs of programmed or sequentially actuated contacts. These pairs of programmed contacts are identified as $S_{1-2}$, $S_{3-4}$, $S_{4-5}$, $S_{6-7}$, $S_{8-9}$, and $S_{10-11}$, the subscripts indicating the particular contact members 102 and portions of the programmed member 84 comprising the pairs of contacts. As seen by the dashed radial line indicating the rest position of the programmed member 84, the programmed contacts $S_{4-5}$, $S_{6-7}$, and $S_{10-11}$ are normally closed while all the rest are normally open.

*Electrical description*

Figure 5:
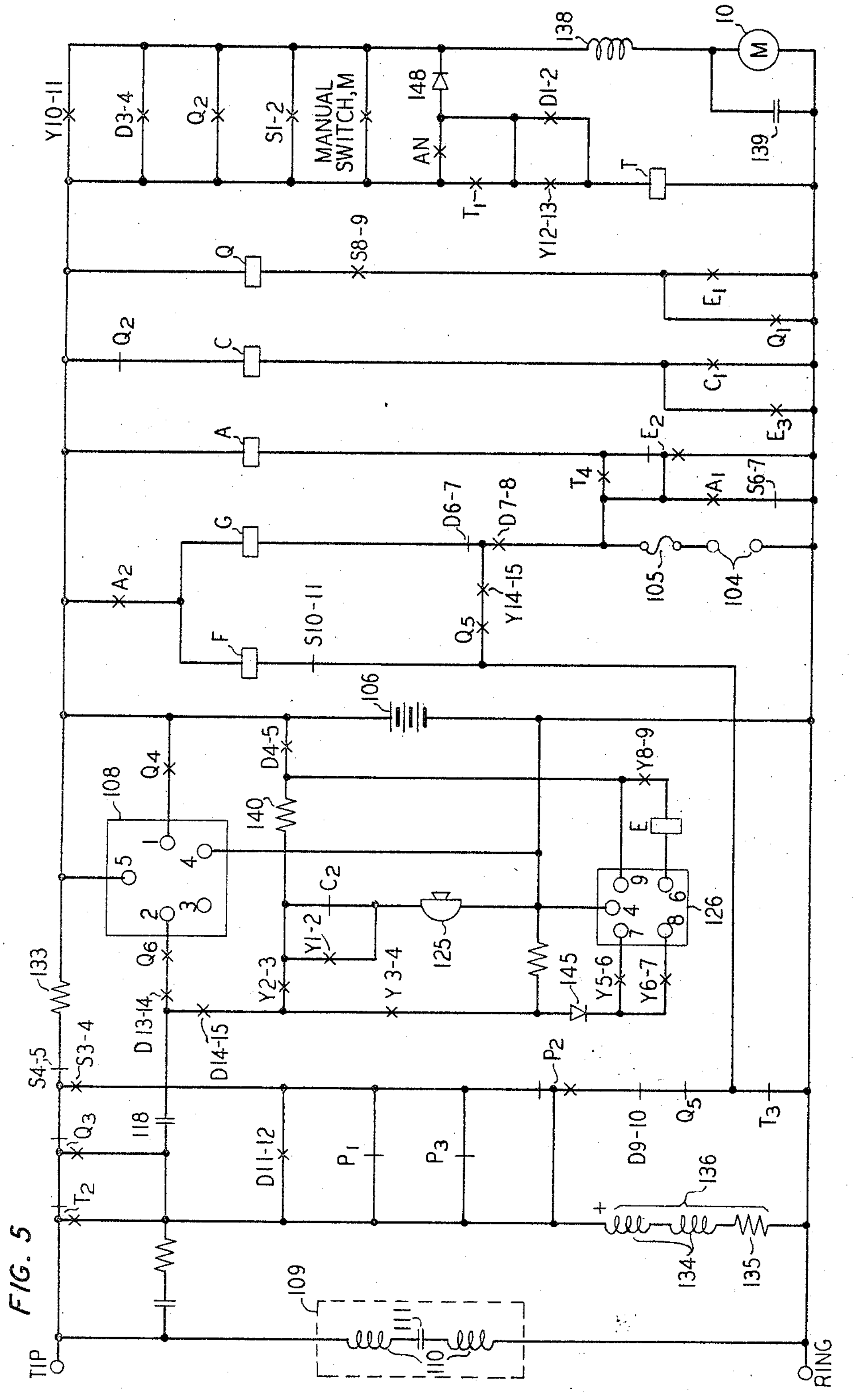
FIG. 5 is a schematic drawing of the electrical circuit of the automatic reporting telephone.

Referring to FIG. 5, the circuit of the automatic reporting telephone is connected across the tip and ring conductors of a telephone line, and in addition to the programmed switching means Y, D, and S, the pulsing switch $P_1$, the initiating and terminating switch $P_2$, and the interdigital switch $P_3$, the circuit includes five relays. These relays are an input relay A, an identifying relay C, a sampling relay E, a message relay Q, and an answering relay T. The input relay A comprises two pairs of normally open contacts $A_1$ and $A_2$; the identifying relay C comprises a pair of normally open contacts $C_1$ and a pair of normally closed contacts $C_2$; and the sampling relay E comprises two pairs of normally open contacts $E_1$ and $E_3$ and a make-before-break transfer pile-up $E_2$ including a pair of normally open contacts and a pair of normally closed contacts. The message relay Q comprises three pairs of normally open contacts $Q_1$, $Q_4$, and $Q_6$, and three make-before-break transfer pileups $Q_2$, $Q_3$, and $Q_5$, each having a pair of normally open contacts and a pair of normally closed contacts. Finally, the answering relay T comprises two pairs of normally open contacts $T_1$ and $T_4$, one pair of normally closed contacts $T_3$ and a make-before-break transfer pileup $T_2$ including a pair of normally open contacts and a pair of normally closed contacts.

The circuit also includes a pair of input terminals 104 that are connected to the particular apparatus that the automatic reporting telephone is to monitor, the aparaus being adapted to provide a momentary closure across the input terminals when the predetermined condition that the automatic reporting telephone is to report occurs. The input terminals 104 are connected in series with a fuse 105 to protect against the application of potentials that might otherwise damage the automatic reporting telephone.

Other major elements of the circuit comprise a battery 106, a message recorder and transmitter 108, and an answering member 109. The battery 106 serves as a source of electrical power for the automatic reporting telephone, and it is adapted to be connected across and charged by the telephone line when the automatic reporting telephone is in a quiescent condition. In the specific embodiment, a rechargeable nickel cadmium battery having a shelf voltage of 14.4 volts is employed.

Figure 6:
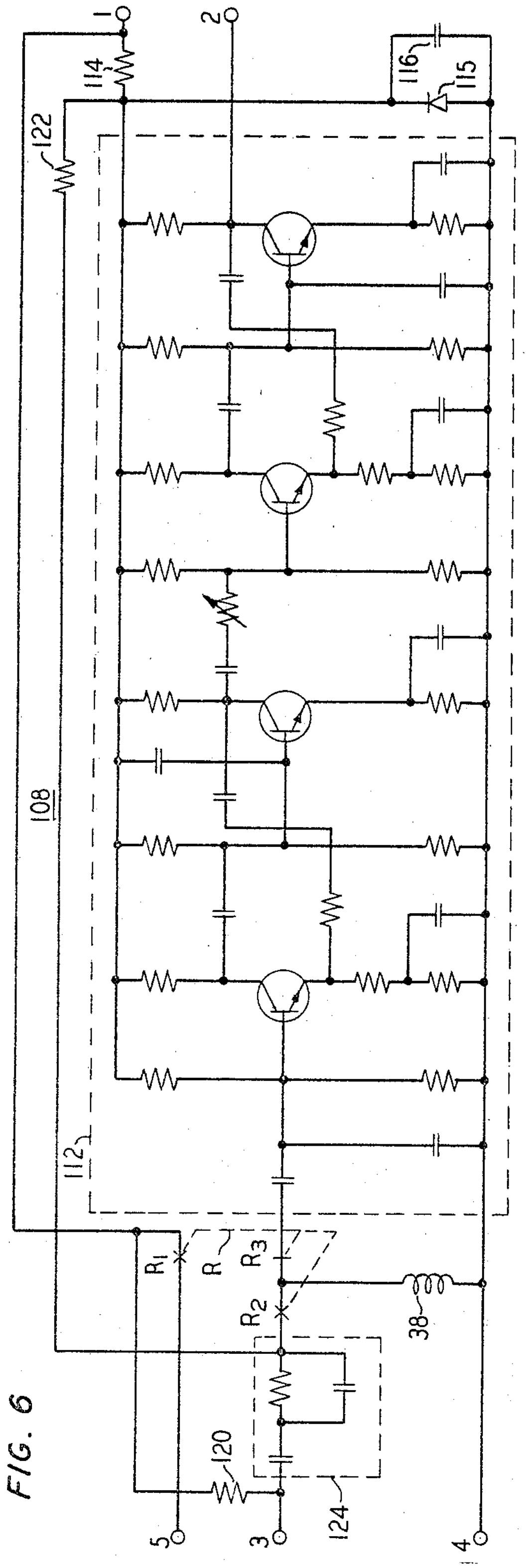
FIG. 6 is a schematic drawing of the message recorder and transmitter circuit that is employed in the automatic reporting telephone.

The message recorder and transmitter 108 provides the means by which a voice message is recorded on the magnetic tape 36 (FIG. 1) and by which a recorded message is reproduced from the magnetic tape and amplified for transmission out on the telephone line. Referring to FIGS. 5 and 6, the message recorder and transmitter 108 includes an amplifier 112, a manual switch R, and the record and reproduce head 38. The amplifier 112 is of a conventional multistage transistorized design, the amplifier in the specific embodiment having a voltage gain of about 770, and having a high input and a low output impedance. Power for the amplifier is provided across terminals 1 and 4, terminal 1 being connectable to the positive side of the battery 106 by the normally open message contacts $Q_4$ and terminal 4 being connected to the negative side of the battery. Current flow is limited by a resistor 114 and the voltage for the amplifier is established by a Zener diode 115 shunted by a capacitor 116.

The manual switch R includes three pairs of contacts $R_1$, $R_2$, and $R_3$, and has two positions, a reproduce position and a record position. With the switch R in its reproduce position, which is considered to be its normal position, the contacts $R_1$ and $R_2$ are open and the contacts $R_3$ are closed. The normally closed contacts $R_3$ connect the record and reproduce head 38 to the input of the amplifier 112 and when the amplifier is energized, the movement of the magnetic tape 36 (FIG. 1) with a message thereon past the head introduces a signal in the head that is amplified by the amplifier and appears across terminals 2 and 4. Terminal 2 is connectable to the tip conductor of the telephone line through the normally open message contacts $Q_6$, programmed contacts normally open $D_{13-14}$, a capacitor 118, and the normally open message contacts $Q_3$, and the terminal 4 is connected to the ring conductor.

With the switch R in its record position, the normally open contacts $R_1$ and $R_2$ are closed and the normally closed contacts $R_3$ are open. The closed normally open contacts $R_1$ and $R_2$ provide a biasing current for the record and reproduce head 38, current flowing from the positive side of the battery 106 through terminal 5, the closed normally open contacts $R_1$, the current limiting resistor 114, a current limiting resistor 122, the closed normally open contacts $R_2$, the head, and terminal 4 to the negative side of the battery.

Then to record a message on the magnetic tape 36 (FIG. 1), a carbon transmitter (not shown) is connected between terminals 3 and 4, and a manual switch M is closed to energize the motor 10. The closed normally open contacts $R_1$ provide a biasing current for the transmitter, current flowing from the positive side of the battery 106 through terminal 5, the closed normally open contacts $R_1$, a current limiting resistor 120, terminal 3, the transmitter, and terminal 4 to the negative side of the battery. The energized motor 10, acting through the sprocket wheel 35 (FIG. 1), moves the magnetic tape 36 past the record and reproduce head 38 and at the same time a message is spoken into the transmitter. This voice message introduces a signal across terminals 3 and 4 and this is filtered by a coupling network 124 and applied to the head 38. The signal effectively varies the direct current bias appearing on the head 38 whereby the message is recorded on the magnetic tape 36. A permanent magnet (not shown) is moved into juxtaposition with the magnetic tape 36 ahead of the head 38 to erase any previously recorded messages.

The answering member 109 is basically a ringer, such as that disclosed in Patent 2,590,500 issued to H. A. Bredehoft and M. S. Richardson on Mar. 25, 1952, and it includes a pair of windings 110 in series with a capacitor 111. However, the answering member 109 has no clapper and gong, and the oscillation of the armature thereof (not shown), due to the application of a ringing voltage, acts to intermitently close a pair of normally open contacts AN. Each closure of the normally open contacts AN connects the motor 10 across the battery 106 to briefly energize the motor, and after a period of time the motor operates the programmed switching means Y to connect the automatic reporting telephone across the telephone line. The answering member 109 is thereby actuated responsive to the ringing voltage generated by the central office to connect the automatic reporting telephone to the telephone line.

The circuit further includes a transmiter 125 and a detector 126. The transmiter 125 is a low resistance inertia type carbon transmiter that is employed to pick up sound generated by the motor 10. At a particular stage in the operation of the automatic reporting telephone, the programmed switching means Y periodically connects the transmitter 125 across the telephone line and during these periods the sound picked up by the transmitter is transmitted out on the telephone line. Thus a party at the station called by the automatic reporting telephone hears alternate intervals of sound and silence, and this coded signal serves as an identification request signal, that is, a request for the party to identify himself. He does this by responding during a first silent interval and not during a second silent interval.

Figure 7:
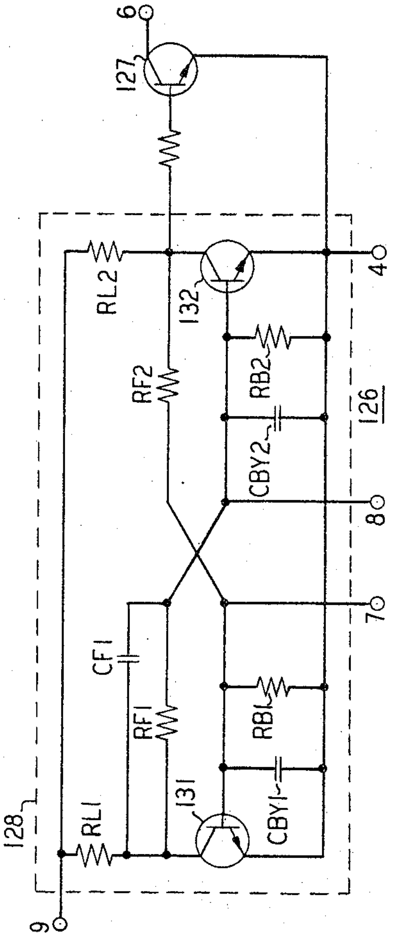
FIG. 7 is a schematic drawing of the detector circuit that is employed in the automatic reporting telephone.

The detector 126 is operated by the responses of the called party during the silent intervals. As shown in FIG. 7, the detector 126 includes an output transistor 127 and a bistable multivibrator 128 having transistors 131 and 132. The detector 126 is energized by the battery 106, terminals 6 and 9 being connectable to the positive side of the battery and terminal 4 being connected to the negative side of the battery. In addition, the mutlivibrator 128 receives input signals transmited over the telephone line, terminals 7 and 8 being connectable to the tip conductor and terminal 4 being connected to the ring conductor.

The bistable multivibrator 128 is of conventional design except that a capacitor $CF_1$ is connected in parallel with the feedback resistor $RF_1$ of only the transistor 132. As a result, whenever the detector 126 is first connected to the battery 106, the multivibrator 128 is always placed in a first stable state in which transistor 132 is on and transistor 131 is off. Furthermore, bypass capacitors $C_{BY}$ are respectively connected in parallel with the base resistors $R_B$. Noise from the telephone line is thereby filtered out and an input of significant voltage (about 0.7 volt in the specific embodiment) is required to change the state of the multivibrator 128. An input of this value can be produced over a telephone line by speaking loudly or dialing a digit, and such an input is referred to as a response signal.

During the first silent interval of the identification request signal, terminal 7 is connected to the tip conductor of the telephone line, and if a response signal is transmitted during the interval, an input occurs at terminal 7 and the multivibrator 128 changes to its second stable state, wherein transistor 131 is on and transistor 132 is off. If no response signal is transmitted during the first silent interval, the multivibrator 128 remains in its first stable state, whereby transistor 132 remains on and transistor 131 remains off.

At the end of the first silent interval, terminal 7 is disconnected from the tip conductor and at the beginning of the second silent interval, terminal 8 is connected thereto. If a response signal is transmitted during the first silent interval and a response signal is again transmitted during the second silent interval, an input occurs at terminal 8 that returns the multivibrator 128 to its first stable state, wherein the transistor 132 is on and transistor 131 is off. If no response signal is transmitted during the first silent interval, then regardless whether or not a response signal is transmitted during the second silent interval, the multivibrator 128 remains in its first stable state wherein transistor 132 is on and transistor 131 is off. However, if a response signal is transmitted during the first silent interval and no response signal is transmitted during the second silent interval, then the multivibrator 128 is held in its second stable state, wherein the transistor 131 is on and the transistor 132 is off. From the foregoing it is seen that only one course of action places the multivibrator 128 in its second stable state, that course of action being transmitting a response signal during the first silent interval and not during the second silent interval. All other courses of action result in the multivibrator 128 being placed in its first stable state, wherein the transistor 132 is on and transistor 131 is off.

At the end of the second silent interval, terminal 8 is disconnected from the tip conductor and terminal 6 is connected to the positive side of the battery 106. If the multivibrator 128 is in its second stable state, the output transistor 127 is turned on and a path is provided between terminals 4 and 6, the path indicating that the proper response signal has been received to the identification request signal. If, on the other hand, the multivibrator 128 is in its first stable state, the output transistor 127 is not turned on and no path is provided between terminals 4 and 6. This indicates that the proper response signal has not been received.

The identification request signal can of course be modified to include three or more silent intervals in which case a more exacting identifying response signal is required of the called or calling party. Furthermore, the detector 126 in combination with means for emitting and transmitting sound over the telephone line and means for switching between the sound emitting and transmitting means and the detector provide an audibly operated combination lock, and such a lock can be employed in conjunction with apparatus other than an automatic reporting telephone. Such a lock could, for example, be used to turn on a home appliance from a distant station.

*Description of operation*

During the operation of the automatic reporting telephone, the programmed members 53 and 66 rotates through a plurality of revolutions and thus the individual pairs of contacts of the programmed switching means Y and D are actuated a plurality of times. However, the logic of the automatic reporting telephone is such that the actuation of each pair of contacts is significant at only a particular time or particular times in the cycle of operation. For purposes of simplicity in the description of operation that follows, reference will be made only to those pairs of contacts whose actuation is of significance at the particular stage of operation being described.

Referring to FIG. 5, when the automatic reporting telephone is in a quiescent state, the battery 106 is connected across the telephone line, the positive side of the battery being connected through a resistor 133, the normally closed programmed contacts $S_{4-5}$, the normally closed message contacts $Q_3$, and the normally closed answering contacts $T_2$ to the tip conductor and the negative side of the battery being connected to the ring conductor. The resistor 133 is a large resistor, in the order of eight kilohms, and thus the current flow to the battery is held to about four milliamps. Since a current flow of eight milliamps or greater is necessary for the central office to recognize that a station is on the line, the battery 106 is able to draw this low order of current from the telephone line without affecting the central office equipment. Though the current flow is small, it serves to maintain the battery 106 in a charged condition.

Upon the occurrence of the predetermined condition that the automatic reporting telephone is to report, the apparatus that the automatic reporing telephone is monioring provides a momentary closure across the input terminal 104. This provides a path from the positive side of the battery 106 through the input relay A, the normally closed sampling contact $E_2$, the fuse 105, and the input terminals 104 to the negative side of the battery. The input relay A is thereby energized, and the normally open contacts $A_1$ and $A_2$ are closed. The closure of the normally open inputs contacts $A_1$ maintains the input relay A in an operated condition by providing in conjunction with the normally closed programmed contacts $S_{6-7}$, a path in parallel with the fuse 105 and the input terminals 104. The closure of the normally open input contacts $A_2$ energizes the start solenoid F by completing the path from the start solenoid to the positive side of the battery 106, the start solenoid being connected to the negative side of the battery by the normally closed programmed contacts $S_{10-11}$ and the normally closed answering contacts $T_3$.

Referring also to FIG. 1, the energization of the start solenoid F draws the armature 86 down out of the path of the finger 85 depending from the programmed member 84, and the motor spring 80 acting through the disc 82 and the shaft 76 commences to rotate the programmed member in a counterclockwise direction with respect to the holder 102, thereby commencing the operation of the programmed switching means S. The speed of rotation of the programmed member 84 is controlled by the clock escapement 88, and after an interval of time (about twenty seconds in the specific embodiment) the normally closed programmed contacts $S_{4-5}$ open to disconnect the battery 106 from the telephone line and the normally open programmed contacts $S_{3-4}$ close to place a coil 134 and a resistor 135 across the telephone line. The coil 134 and resistor 135 provide a line termination load 136 such that there is a current flow of eighteen mils or more, the current flowing from the tip conductor through the normally closed answering contacts $T_2$, the normally closed message contacts $Q_3$, the closed normally open programmed contacts $S_{3-4}$, either the normally closed pulsing contacts $P_1$, normally closed interdigital contacts $P_3$, or normally closed initiating and terminating contacts $P_2$, the coil 134, and the resistor 135 to the ring conductor. Thus it appears to the central office that the automatic reporting telephone has at that moment been connected across the telephone line. In the specific embodiment, the coil 134 has an inductance of two henries and a resistance of seventy-five ohms and the resistor 135 has a resistance of one hundred thirty ohms.

After an interval of time (ten seconds in the specific embodiment) to permit the central office to react to the appearance of the automatic reporting telephone across the telephone line and place a dial tone on the line, the normally open programmed contacts $S_{1-2}$ close and connect the motor 10, which has an inductor 138 in series therewith and a capacitor 139 in parallel therewith, to limit motor noise across the battery 106. The motor 10 is energized and commences to rotate, and as a result the pulsing cam 20, the sprocket wheel 35, the number selecting member 52, and the programmed members 53 and 66 commence to rotate.

The rotation of the pulsing cam 20 together with the first revolution of the number selecting member 52 results in the calling of the telephone number preselected by the spacing of the interdigital clips 58 on the number wheel. The rotation of the sprocket wheel 35 moves the magnetic tape 36 past the record and reproduce head 38, but inasmuch as the message recorder and transmitter 108 are not energized at this time, the message recorded on the tape is not transmitted. Finally, the rotation of the programmed members 53 and 66 respectively commences the operation of the programmed switching means Y and D.

As the number selecting member 52 starts to rotate, the initiating arm 55 mounted thereon actuates the initiating and terminating switch $P_2$ to close the normally open contacts thereof and open the normally closed contacts thereof. A short is thereby placed across the termination load 136, and current flows from the tip conductor through the normally closed answering contacts $T_2$, the normally closed message contacts $Q_3$, the closed normally open programmed contacts $S_{3-4}$, either the normally closed pulsing contacts $P_1$ or normally closed interdigital contacts $P_3$, the closed normally open initiating and terminating contacts $P_2$, the normally closed programmed contacts $D_{9-10}$, the normally closed message contacts $Q_5$, and the normally closed answering contact $T_3$ to the ring conductor. This provides a noninductive path for the current.

As the number selecting member 52 continues to rotate, the normally closed interdigital contacts $P_3$ are opened for varying intervals by the disengagement of the contacts from the interdigital clips 58, the spacing between the clips being proportionate to the values of the digits represented thereby. During the intervals that the interdigital contacts $P_3$ are open, the only path for the line current is through the normally closed pulsing contacts $P_1$. However, each revolution of the pulsing cam 20 opens the normally closed pulsing contacts $P_1$, and thus during these intervals the telephone line is interrupted and groups of pulses corresponding to the preselected digits are transmitted to the central office.

Shortly after the transmission of the preselected telephone number commences, the normally open programmed contacts $Y_{10-11}$ close and the closed normally open programmed contacts $S_{1-2}$ open, shifting the current path for the motor 10 from the latter to the former. Thereafter the normally open programmed contacts $D_{3-4}$ close to provide a path in parallel with the programmed contacts $Y_{10-11}$.

At about the same time, the normally closed programmed contacts $S_{10-11}$ open to interrupt the current path to the start solenoid F. The start solenoid F is deenergized, and the armature 86 returns to its upward position. However, by this time the programmed member 84 has rotated to a position where the depending finger 85 is past the armature. Thus it is no longer necessary to maintain the start solenoid F energized, and power is conserved by de-energizing it.

After the last digit of the preselected telephone number is transmitted, the terminating arm 56 operates the initiating and terminating switch $P_2$ to close the normally closed contacts and then open the normally open contacts thereof. Thus during the remainder of the revolution of the number selecting member 52, a shunt path is provided around the normally closed pulsing contacts $P_1$, whereby the opening of the pulsing contacts does not interrupt the telephone line, and the termination load 136 is again placed across the telephone line, whereby current flow is limited to the desirable level.

As the number selecting member 52 completes a first revolution, the programmed member 53, being mounted on the same shaft, also completes a first revolution, while the programmed member 66, which rotates at one-third their speed, completes one-third of a revolution. Just before the end of the first revolution of the programmed member 53, the closed normally open programmed contacts $Y_{10-11}$ open and shortly after the second revolution of the programmed member 53 commences, the contacts re-close. During the period that the programmed contacts $Y_{10-11}$ are open, the connection of the motor 10 across the battery 106 is maintained by the closed normally open programmed contacts $D_{3-4}$.

As the programmed member 53 commences the second revolution and the programmed member 66 commences the middle third of its first revolution, the normally closed programmed contacts $D_{9-10}$ open and the normally open programmed contacts $D_{11-12}$ close. The opening of the normally closed programmed contacts $D_{9-10}$ prevents the transfer of the initiating and terminating switch $P_2$ by the initiating arm 55 from placing a short across the termination load 136, and the closing of the normally open programmed contacts $D_{11-12}$ prevents the interruption of the telephone line by the opening of the normally closed pulsing contacts $P_1$ and the opening of the normally closed interdigital contacts $P_3$. The programmed contacts $D_{9-10}$ and $D_{11-12}$ remain in this condition for the remainder of the revolution of the programmed member 66, and thus no pulses are transmitted during the second and third revolutions of the programmed member 53.

The interval of time during which the programmed member 53 makes its second revolution provides the necessary time for the central office to ring the called station and for the monitor at the called station to answer. When, during the interval of time, the monitor does answer, he hears what appears to be a vacant line. Thus should a switching error occur at the central office whereby a wrong number is reached, this silence encourages the answering party to hang up.

Just before the end of the second revolution of the programmed member 53, the closed normally open programmed contacts $Y_{10-11}$ again open and then shortly after the third revolution of the programmed member 53 commences, the contacts again re-close. During the period that the programmed contacts $Y_{10-11}$ are open, the closed normally open programmed contacts $D_{3-4}$ again maintain the connection of the motor 10 across the battery 106.

As the programmed member 66 begins the last third of its first revolution and the programmed member 53 begins its third revolution, the normally open programmed contacts $D_{4-5}$ and $D_{14-15}$ close. The closure of the normally open programmed contacts $D_{4-5}$ provides a biasing current for the transmitter 125 by connecting it across the battery 106, current flowing from the positive side of the battery through the closed normally open programmed contacts $D_{4-5}$, a resistor 140, the normally closed identifying contacts $C_2$, and the transmitter to the negative side of the battery. In addition, the closure of the normally open programmed contacts $D_{4-5}$ energizes the detector 126, placing the bistable multivibrator 128 (FIG. 7) in its first stable state wherein the transistor 132 is on and the transistor 131 is off. Current flows from the positive side of the battery 106 through the closed normally open programmed contacts $D_{4-5}$ and between terminals 9 and 4 of the detector 126 to the negative side of the battery. The closure of the normally open programmed contacts $D_{14-15}$ permits the transmission of the identifying request signal, the transmission being accomplished by the programmed switching means Y in the following manner.

The normally open programmed contacts $Y_{2-3}$ close shortly after the normally open programmed contacts $D_{14-15}$ and connect the transmitter 125 across the telephone line, a path extending from the tip conductor through the normally closed answering contacts $T_2$, the normally closed message contacts $Q_3$, the closed normally open programmed contacts $S_{3-4}$ and $D_{11-12}$, the capacitor 118, the closed normally open programmed contacts $D_{14-15}$, the closed normally open programmed contacts $Y_{2-3}$, the normally closed identifying contacts $C_2$, and the transmitter 125 to the ring conductor. The transmitter 125 is physically located to pick up the sound of the motor 10, and consequently it transmits this sound out on the telephone line. The motor 10 serves as a readily available sound generator, and at the same time the sound generated by the motor is such that if the central office has connected the automatic reporting telephone to a wrong station, the answering party is again encouraged to hang up.

The normally open programmed contacts $Y_{2-3}$ remain closed for a relatively long interval of time (6.0 seconds in the specific embodiment) whereby the sound is transmitted for a relatively long interval of time. This first interval of sound alerts the monitor to prepare to respond. The first interval of sound is terminated and a first interval of silence is initiated by the opening of the programmed contacts $Y_{2-3}$, whereby the transmitter 125 is disconnected from the telephone line, and shortly thereafter the normally open programmed contacts $Y_{3-4}$ close, followed by the closing of the normally open programmed contacts $Y_{5-6}$. The latter two pairs of contacts connect the detector 126 across the telephone line, terminal 7 being connected to the tip conductor through the closed normally open programmed contacts $Y_{5-6}$, a diode 145, the closed normally open programmed contacts $Y_{3-4}$, the closed normally open programmed contacts $D_{14-15}$, the capacitor 118, the closed normally open programmed contacts $D_{11-12}$ and $S_{3-4}$, the normally closed message contacts $Q_3$, the normally closed answering contacts $T_2$, and terminal 4 being connected to the ring conductor.

If at this time a response signal is transmitted over the telephone line, the bistable multivibrator 128 (FIG. 7) of the detector 126 is switched to its second stable state wherein the transistor 131 is on and the transistor 132 is off. If no response signal is transmitted the bistable multivibrator 128 remains in its first stable state.

A response signal is transmitted in one of three ways. First, if the called station has not answered, a response signal is transmitted in the form of the ringing tone generated by the central office. Second, if the called station is busy, a response signal is transmitted in the form of the busy tone generated by the central office. Third, if the called station has answered, a response signal is transmitted in the form of some audible action, such as talking loudly or dialing a digit, by the called party. The first silent interval is of a length (3.0 seconds in the specific embodiment) to permit a response signal to be transmitted in any one of these ways.

The first interval of silence is terminated by the opening of the normally open programmed contacts $Y_{3-4}$ and $Y_{5-6}$, whereby the detector 126 is disconnected from the telephone line, and then the second interval of sound is initiated by the closing of the normally open programmed contacts $Y_{2-3}$, whereby the transmitter 125 is re-connected across the telephone line. The second interval of sound is relatively short (1.1 seconds in the specific embodiment) and serves only to signify the end of the first interval of silence. At about this same time, closed normally open programmed contacts $D_{3-4}$ open, leaving only the closed normally open programmed contacts $Y_{10-11}$ to maintain the connection of the motor 10 across the battery 106.

The second interval of sound is terminated by the opening of the normally open programmed contacts $Y_{2-3}$, whereby the transmitter 125 is again disconnected from the telephone line, and then the second interval of silence is initiated by the closing of the normally open programmed contacts $Y_{3-4}$ and $Y_{6-7}$. The detector 126 is thereby re-connected across the telephone line, only this time terminal 8 rather than terminal 7 of the detector is connected to the tip conductor.

If no response signal is transmitted during the second silent interval and no response signal was transmitted during the first silent interval, the bistable multivibrator 128 (FIG. 7) of the detector 126 remains in its first stable state wherein the transistor 132 is on and the transistor 131 is off. If a response signal is transmitted during the second silent interval and no response signal was transmitted during the first silent interval, the bistable multivibrator 128 again remains in its first stable state. If a response signal is transmitted during the second silent interval and a response signal was transmitted during the first silent interval, the bistable multivibrator is switched to its first stable state wherein the transistor 132 is on and the transistor 131 is off. However, if no response signal is transmitted during the second silent interval and a response signal was transmitted during the first silent interval, the bistable multivibrator 128 remains in its second stable state wherein the transistor 131 is on and the transistor 132 is off.

Thus it is seen that all courses of action but one result in the bistable multivibrator 128 being in its first stable state at the end of the second silent interval. Only the transmission of a response signal during the first silent interval and no transmission of a response signal during the silent interval and no transmission of a response signal during the second silent interval results in the bistable multivibrator 128 being in its second stable at the end of the second silent interval. The second silent interval is advantageously longer than the first silent interval and is of a length (4.9 seconds in the specific embodiment) to assure that a response signal is transmitted if the called station has not answered or is busy. If the called station has answered, this longer silent interval provides greater opportunity for a response signal to be transmitted, thereby giving greater assurance that the lack of a response signal during this second silent interval is premeditated and not accidental.

The second silent interval is terminated by the opening of the normally open programmed contacts $Y_{3-4}$ and $Y_{6-7}$, whereby the detector 126 is disconnected from across the telephone line, and a third interval of sound that signifies the end of the identification request signal is initiated by the closing of the normally open programmed contacts $Y_{2-3}$, whereby the transmitter 125 is once again connected across the telephone line. At the same time the normally open programmed contacts $Y_{8-9}$ close momentarily and a path is provided from terminal 6 of the detector 126 through the sampling relay E, the closed normally open programmed contacts $Y_{8-9}$, and the closed normally open programmed contacts $D_{4-5}$ to the positive side of the battery 106.

If the detector 126 has received the proper response signal, the bistable multivibrator 128 (FIG. 7) is in its second stable state wherein the transistor 131 is on and the transistor 132 is off, and upon the connection of terminal 6 of the detector to the positive side of the battery 106, the transistor 127 is switched on and a path is provided through the transistor and terminal 4 to the negative side of the battery. As a result, the sampling relay E is energized. If the detector 126 has not received the proper response signal, the bistable multivibrator 128 is in its first stable state wherein the transistor 132 is on and the transistor 131 is off, and upon the connection of terminal 6 to the positive side of the battery 106, the transistor 127 is not switched on, no path is provided between terminals 6 and 4, and the sampling relay E is not energized.

Taking the latter situation first, if the proper response signal is not received, just before the end of the first revolution of the programmed member 66 the closed normally open programmed contacts $D_{4-5}$ and $D_{14-15}$ open, respectively disconnecting the transmitter 125 and the detector 126 from across the battery 106 and from across the telephone line. Shortly thereafter, the normally open programmed contacts $D_{11-12}$ open, removing the short from across the pulsing contacts $P_1$ and then as the programmed member 53 completes is third revolution the normally open programmed contacts $Y_{10-11}$ open, disconnecting the motor 10 from across the battery 106. The de-energization of the motor 10, of course, terminates the rotation of the programmed members 53 and 66 and thereby the operation of the programmed switching means Y and D. However, the input relay A remains energized and the programmed switching means S continue to operate.

After a period of time (approximately one minute in the specific embodiment), the normally open programmed contacts $S_{3-4}$ open, disconnecting the termination load 136 from across the telephone line and the normally closed programmed contacts $S_{4-5}$ close, connecting the battery 106 across the telephone line through the large resistor 133. As a result, it appears to the central office that the automatic reporting telephone is no longer connected across the telephone line, and the central office drops the connection with the called station. At the same time, the battery 106 commences to re-charge.

After another period of time (two minutes in the specific embodiment), the normally closed programmed contacts $S_{4-5}$ re-open and the normally open programmed contacts $S_{3-4}$ re-close. The battery 106 is thereby disconnected from across the telephone line and the termination load 136 is placed thereacross effecting a seizing of the telephone line. A delay is provided for dial tone, and then the normally open programmed contacts $S_{1-2}$ close and connect the motor 10 across the battery 106. The energized motor 10 commences to rotate the programmed members 53 and 66 and thereby commences the operation of the programmed switching means Y and D, and a second calling of the preselected telephone number and transmission of the identification request signal occurs.

If the proper response signal is again not received, the automatic reporting telephone continues to repeat the cycle. If necessary, the cycle is repeated a total of six times. If the proper response signal is not received during the seventh cycle, at the end of the cycle the normally closed programmed contacts $S_{6-7}$ open briefly. The input relay A is thereby disconnected from the battery 106 and de-energized. Finally, at the end of a complete revolution of the programmed member 84, the depending pin 85 engages the armature 86 of the start solenoid F, and the motion of the programmed member 84 and thereby the operation of the programmed switching means S is terminated. The automatic reporting telephone is thereby returned to its quiescent condition.

If the proper response signal is received, the sampling relay E is energized. The contact group $E_2$ transfers to open the normally closed and close the normally open contacts thereof, and the normally open contacts $E_1$ and $E_3$ close. The opening of the normally closed contacts $E_2$ breaks the connection of the input relay A across the battery 106. The input relay A is thereby de-energized, and the normally open input contacts $A_1$ and $A_2$ open. At the same time, the closure of the normally open sampling contacts $E_1$ completes the connection of the message relay Q across the battery 106, current flowing from the positive side of the battery through the relay Q, the closed normally open programmed contacts $S_{8-9}$, and the closed normally open sampling contacts $E_1$ to the negative side of the battery. The message relay Q is thereby energized. Finally, the closing of the normally open sampling contacts $E_3$ connects the identifying relay C across the battery 106.

The energization of the message relay Q also results in the closing of the normally open contacts $Q_1$, $Q_4$, and $Q_6$, and the transfer of the contact groups $Q_2$, $Q_3$, and $Q_5$ whereby the normally open contacts thereof are closed and the normally closed contacts thereof are opened. The closed normally open message contacts $Q_1$ provide a path in parallel with the closed normally open sampling contacts $E_1$ and thus the contacts $Q_1$ maintain the connection of the message relay Q across the battery 106 when, upon the opening of the normally open programmed contacts $Y_{8-9}$, the sampling relay E is de-energized and the contacts $E_1$ open.

The open normally closed message contacts $Q_2$ interrupt the connection of the indentifying relay C across the battery 106, and the relay is de-energized. The closed normally open message contacts $Q_2$ provide a path in parallel with the closed normally open programmed contacts $Y_{10-11}$, and therefore when the contacts $Y_{10-11}$ open at the end of the third revolution of the programmed member 53, the contacts $Q_2$ maintain the connection of the motor 10 across the battery 106. The continued energization of the motor 10 results in a second cycling of the programmed switching means Y and D whereby the programmed member 53 again rotates through three revolutions and the programmed member 66 again rotates through one revolution. This second cycle provides for the transmission of a recorded message twice and then the transmission of the identification request signal to permit requests for additional repeats of the recorded message.

The closed normally open message contacts $Q_3$ provide a path in parallel with the closed normally open programmed contacts $S_{3-4}$, the normally open programmed contacts $D_{11-12}$, the normally closed pulsing contacts $P_1$, the normally closed interdigital contacts $P_3$, and the normally closed initiating and terminating contacts $P_2$. As a result, the closed normally open message contacts $Q_3$ both maintain the connection of the termination load 136 across the telephone line, whereby the line is not dropped when the closed normally open programmed contacts $S_{3-4}$ open, and prevent the pulsing of the telephone line. The open normally closed message contacts $Q_3$ are in series with the open normally closed programmed contacts $S_{4-5}$, and consequently the battery 106 remains disconnected from across the telephone line when the contacts $S_{4-5}$ subsequently close.

The open normally closed message contacts $Q_5$ are in series with the normally open initiating and terminating contacts $P_2$, the normally closed programmed contacts $D_{9-10}$, and the normally closed answering contacts $T_3$. As a result, the open normally closed message contacts $Q_5$ prevent the shorting of the termination load 136 when the normally open initiating and terminating contacts $P_2$ close. The closed normally open message contacts $Q_5$, on the other hand, are in series with the normally closed answering contacts $T_3$, the normally open programmed contacts $Y_{14-15}$, and the normally closed programmed contacts $D_{6-7}$, and when the contacts $Y_{14-15}$ and $D_{6-7}$ are closed, a path is provided from the release solenoid G to the negative side of the battery 106.

Finally, the closed normally open message contacts $Q_4$ complete the connection of the message recorder and transmitter 108 across the battery 106, current flowing from the positive side of the battery through the contacts $Q_4$ and between the terminals 1 and 4 of the message recorder and transmitter to the negative side of the battery; and the closed normally open message contacts $Q_6$ complete the connection of the message recorder and transmitter across the telephone line, the path extending from the tip conductor through the normally closed answering contacts $T_2$, the closed normally open message contacts $Q_3$, the capacitor 118, the closed normally open programmed contacts $D_{13-14}$, the contacts $Q_6$, and between terminals 2 and 4 of the message recorder and transmitter to the tip conductor. As a result, the amplifier 112 (FIG. 6) of the message recorder and transmitter 108 are energized, and as the magnetic tape 36 is driven past the record and reproduce head 38 by the sprocket wheel 35, the message recorded thereon induces a signal in the head that is amplified and transmitted out on the telephone line.

The recorded message is transmitted twice, during which time the programmed member 53 rotates through two revolutions and the programmed member 66 rotates through two-thirds of one revolution. Just before the end of the second revolution of the programmed member 53 and the second third of the revolution of the programmed member 66, the normally open programmed contacts $Y_{14-15}$ and $D_{7-8}$ both close for a brief time. A path is thereby provided from the positive side of the battery 106 through the input relay A, the normally closed sampling contacts $E_2$, the closed normally open programmed contacts $D_{7-8}$, the closed normally open programmed contacts $Y_{14-15}$, the closed normally open message contacts $Q_5$, and the normally closed answering contacts $T_3$ to the negative side of the battery. The input relay A is thereby energized, closing the normally open contacts $A_1$ and $A_2$ thereof. The closed normally open input contacts $A_1$ in combination with the normally closed sampling contacts $E_2$ and the normally closed programmed contacts $S_{6-7}$ provide an alternate path to the negative side of the battery 106 and thereby maintain the input relay A energized when the closed normally open programmed contacts $Y_{14-15}$ and $D_{7-8}$ open. The closed normally open input contacts $A_2$ provide a path from the release solenoid G to the positive side of the battery 106.

As the programmed member 53 commences a third revolution and the programmed member 66 commences the last third of its revolution, the normally open programmed contacts $D_{13-14}$ open, disconnecting the message recorder and transmitter 108 from across the telephone line. At the same time, the normally open programmed contacts $D_{4-5}$ close whereby the transmitter 125 and detector 126 are connected across the battery 106, and the normally open programmed contacts $D_{14-15}$ close whereby the programmed switching means Y is able to alternately connect the transmitter and detector across the telephone line to transmit the identification request signal and receive the response signal in the aforedescribed manner.

If the proper response signal is received, the sampling relay E is energized and the opening of the normally closed sampling contacts $E_2$ breaks the connection of the input relay A across the battery 106. The input relay A is de-energized and the closed normally open input contacts $A_2$ open, interrupting the path between the release solenoid G and the positive side of the battery 106. The circuit of the automatic reporting telephone is in the same condition as when the sampling relay E was energized the first time, and consequently the automatic reporting telephone again transmits the recorded message twice and then again transmits the identification request signal. It is thus possible for the called party to obtain as many repeats of the recorded message as may be necessary.

If the proper response signal is not received, just before the end of the third revolution of the programmed member 53 and the last third of the revolution of the programmed member 66, the normally open programmed contacts $Y_{14-15}$ and $D_{6-7}$ close. The release solenoid G is thereby connected across the battery 106, current flowing from the positive side of the battery through the closed normally open input contacts $A_2$, the release solenoid, the normally closed programmed contacts $D_{6-7}$, the closed normally open programmed contacts $Y_{14-15}$, the closed normally open message contacts $Q_5$, and the normally closed answering contacts $T_3$ to the negative side of the battery. The energized release solenoid G withdraws the clock escapement 88 from the pinion 96, and the motor spring 80 acting through the disc 82 and the shaft 76 rapidly rotates the programmed member 84 until the finger 85 depending therefrom engages the armature 86 of the start solenoid F and the motion of the programmed member is arrested. As the programmed member 84 rotates to this rest position, the normally open programmed contacts $S_{3-4}$ open and the normally closed programmed contacts $S_{4-5}$ close. The termination load 136 is thereby disconnected from the telephone line and the battery 106 connected thereacross, and the central office drops the connection with the called station. In addition, the normally closed programmed contacts $S_{6-7}$ momentarily open and de-energize the input relay A. Finally, when the programmed member 84 reaches the rest position, the normally open programmed contacts $S_{8-9}$ open and de-energize the message relay Q. The normally open message contacts $Q_2$ are thereby open, and when the closed normally open programmed contacts $Y_{10-11}$ subsequently open, the motor 10 is de-energized. The automatic reporting telephone is thus returned to a quiescent condition.

To check the automatic reporting telephone to see that it is operating correctly, a monitor at the preselected station called by the automatic reporting telephone, calls the station number of the automatic reporting telephone. In response thereto, the automatic switching equipment of the appropriate central office applies an alternating current ringing voltage to the telephone line with which the automatic reporting telephone is associated, and the ringing voltage appears across the answering member 109. The normally open answering contacts AN are thereby intermittently closed, and each closure thereof connects the motor 10 across the battery 106, current flowing from the positive side of the battery through the closed normally open contacts AN, a diode 148, the inductor 138, and motor 10 to the negative side of the battery. Each energization of the motor 10 causes it to rotate the programmed members 53 and 66, and after a period of time (about 24 seconds in the specific embodiment), the energizations rotate the programmed member 53 far enough to close the normally open programmed contacts $Y_{10-11}$. The motor 10 is thereupon provided with a continuous connection across battery 106, and the programmed members 53 and 66 commence their normal speeds of rotation.

Shortly thereafter, the normally open programmed contacts $Y_{12-13}$ close, and with the next closure of the normally open answering contacts AN, the answering relay T is energized, current flowing from the positive side of the battery 106 through the closed contacts AN, the closed contacts $Y_{12-13}$, and the answering relay T to the negative side of the battery. The energization of answering relay T results in the closing of the normally open contacts $T_1$ and $T_4$, the opening of the normally closed contacts $T_3$, and the transfer of the pile-up $T_2$ whereby the normally open contacts thereof are closed and the normally closed contacts thereof are open.

The closed normally open answering contacts $T_1$ are in parallel with the closed normally open answering contacts AN, and thus the answering relay T remains energized when the contacts AN immediately re-open. Furthermore, during the first revolution of the programmed member 53, the normally open programmed contacts $D_{1-2}$ close to provide a path in parallel with the closed normally open programmed contacts $Y_{12-13}$. The normally open programmed contacts $D_{1-2}$ remain closed until the middle of the third revolution of the programmed member 53, and thus when the closed normally open programmed contacts $Y_{12-13}$ open at the end of the first and second revolutions of the programmed member 53 the answering relay T remains energized.

The closed normally open answering contacts $T_2$ connect the termination load 136 across the telephone line and place a short across the pulsing contacts $P_1$, while the open normally closed answering contacts $T_2$ disconnect the battery 106 from the telephone line. It therefore appears to the central office that the automatic reporting telephone has answered, whereby the application of ringing voltage is disconnected and the calling station is connected to the automatic reporting telephone.

The open normally closed answering contacts $T_3$ are in series with the normally open initiating and terminating contacts $P_2$, the normally closed programmed contacts $D_{9-10}$, and the normally closed message contacts $Q_5$, and thus the contacts $T_3$ prevent the shorting of the termination load 136 when the contacts $P_2$ close. Finally, for purposes hereinafter explained, the closed normally open answering contacts $T_4$ provide a path in parallel with the normally closed sampling contacts $E_2$.

During the first two revolutions of the programmed member 53 and the first two-thirds of a revolution of the programmed member 66, the automatic reporting telephone is silent, and the calling party hears what appears to be a vacant line. Thus should a person call the automatic reporting telephone by mistake, he is encouraged by this period of silence to hang up. During the third revolution of the programmed member 53 and the last third of the revolution of the programmed member 66, the programmed switching means Y and D interact with the transmitter 125 and detector 126 to transmit the identification request signal.

If the automatic reporting telephone receives the proper response signal to the identification request signal, the sampling relay E is energized in the manner heretofore set forth. However, the energization of the sampling relay E now serves to energize the input relay A instead of releasing it. The closing of the normally open sampling contacts $E_2$ in combination with the closed normally open answering contacts $T_4$ connects the input relay A across the battery 106, whereupon the normally open input contacts $A_1$ close and in combination with the normally closed programmed contacts $S_{6-7}$ maintain the connection. In addition, the normally open input contacts $A_2$ close and connect the start solenoid F to the positive side of the battery 106.

Furthermore, the energization of the sampling relay E closes the normally open contacts $E_3$ thereof. This connects the identifying relay C across the battery 106, current flowing from the positive side of the battery through the normally closed message contacts $Q_2$, the identifying relay, and the closed answering contacts $E_3$ to the negative side of the battery. The identifying relay C is energized, closing the normally open contacts $C_1$ and opening the normally closed contacts $C_2$. The closing of the normally open identifying contacts $C_1$ provides a path in parallel with the closed normally open answering contacts $E_3$, and therefore the identifying relay C remains energized even after the sampling relay E is de-energized. The opening of the normally closed identifying contacts $C_2$ removes a path in parallel with the normally open pulsing contacts $Y_{1-2}$ and in a manner hereinafter described, this results in an identification request signal that is different from the identification request signal that is transmitted when the automatic reporting telephone is acivated by an actual input from the equipment with which it is associated.

If the automatic reporting telephone does not receive the proper response signal, the sampling relay E, and therefore the input relay A and the identifying relay C are, of course, not energized.

Near the end of the third revolution of the programmed member 53, the closed normally open programmed contacts $Y_{12-13}$ open and interrupt the connection of the answering relay T across the battery 106. The answering relay T is de-energized, and the pile-up $T_2$ thereof transfers and disconnects the termination load 136 from across the telephone line and connects the battery 106 thereacross. Thus it appears to the central office that the automatic reporting telephone has disconnected from the telephone line, but since the automatic reporting telephone was the called station, this does not necessarily clear the line. The calling station must in most instances hang up to do this.

The de-energization of the answering relay T also causes the answering contacts $T_3$ to close, and if the proper response signal to the identification request signal was received, the start solenoid F is energizzed, current flowing from the positive side of the battery 106 through the closed normally open input contacts $A_2$, the start solenoid, the normally closed programmed contacts $S_{10-11}$, and the normally closed answering contacts $T_3$ to the negative side of the battery. The energized start solenoid F withdraws the armature 86 from the depending finger 85 of the programmed member 84, and the programmed member 84 commences to rotate. As a result, the automatic reporting telephone commences to operate in the same manner as if an actual input from the associated equipment had occurred.

If the proper response signal to the identifying request signal was not received, the start solenoid F is not energized, and shortly after the de-energization of the answering relay T, the closed normally open programmed contacts $Y_{10-11}$ open and de-energize the motor 10. The automatic reporting telephone is thereby returned to a quiescent condition.

If the proper response signal was received, the de-energization of the motor 10 does not return the automatic reporting telephone to a quiescent condition inasmuch as the start solenoid F, the input relay A, and the identifying relay C remain energized and the programmed member 84 continues to rotate. Shortly after the motor 10 is de-energized, the programmed switching means S operates to seize the telephone line and re-energize the motor.

The automatic reporting telephone then commences to call the preselected station and transmits the identification request signal in the same manner as previously described except for one difference. However, when the transmitter 125 is connected across the telephone line, because the normally closed identifying contacts $C_2$ are open, the transmitter is connected to the tip conductor through the closed normally open programmed contacts $Y_{1-2}$.

As seen by FIG. 2, the programmed contacts $Y_{1-2}$ open and close repeatedly, and hence the intervals of sound of the identification request signal are interrupted rather than steady. This serves to uniquely identify that this call by the automatic reporting telephone is as a result of a call to the automatic reporting telephone and is not the result of an actual input from the associated equipment. When the automatic reporting telephone receives the proper response signal to the identification request signal, the message relay Q is energized, and upon the opening of the normally closed message contacts $Q_2$, the identifying relay C is de-energized.

What is claimed is:

1. Apparatus associated with the telephone line for automatically reporting when a predetermined condition occurs, the apparatus comprising:
 a line termination load;
 a sound generator;
 means responsive to the occurrence of the perdetermined condition for connecting the line termination load across the telephone line and energizing the sound generator;
 means for subsequently transmitting dial signals out on the telephone line to make a calling connection with a preselected station;
 means for thereafter periodically transmitting the sound produced by the sound generator out on the telephone line to provide a periodic audible signal;
 a bistable multivibrator having two input terminals connectable to the telephone line, each of the input terminals being connected to the telephone line during certain of the intervals between the periods of transmission, the bistable multivibrator changing from one state to the other responsive to signals received during the intervals; and
 means responsive to the bistable multivibrator being in a particular state at the end of a predetermined number of intervals for transmitting a verbal message to the called station apprising of the predetermined condition.

2. Apparatus associated with the telephone line for automatically reporting when a predetermined condition occurs, the apparatus comprising:
 line termination means;
 signal transmitting means;
 signal detecting means;
 means responsive to the occurrence of a predetermined condition for connecting the line termination means across the telephone line;
 means for thereafter calling a preselected station;
 means for subsequently alternately connecting the signal transmitting means and the signal detecting means across the telephone line for preselected intervals of time, the signal detecting means being placed in a particular condition responsive to signals received during certain of the intervals; and
 means responsive to the detecting means being in a particular condition for transmitting a message out on the telephone line apprising of the occurrence of the predetermined condition.

3. Apparatus associated with a telephone line for automatically reporting when a predetermined condition occurs, the apparatus comprising:
 means responsive to the occurrence of the predetermined condition for seizing the telephone line;
 means for thereafter calling a preselected station;
 means for subsequently transmitting a coded signal out on the telephone line;
 means for detecting responses to the coded signal, the detecting means only responding to responses from the called station, the detecting means being placed in a particular condition by the responses from the called station; and
 means responsive to the detecting means being in the particular condition for transmitting a message to the called station.

4. Apparatus associated with a telephone line for automatically reporting when a predetermined condition occurs, the apparatus comprising:
 means responsive to the occurrence of the predetermined condition for seizing the telephone line;
 means for thereafter calling a preselected station;
 means for subsequently transmitting a periodic signal out on the telephone line;
 means for detecting responses to the signal during the intervals between the periods of transmission, the detecting means being placed in a particular condition by responses during only certain of the intervals; and means responsive to the detecting means being in the particular condition for transmitting a message out on the telephone line apprising of the occurrence of the predetermined condition;

wherein after the message is transmitted, the signal transmitting means again transmits the periodic signal out on the telephone line, the detecting means is again placed in the particular condition by the responses during only certain of the intervals, and the message transmitting means again transmits the message responsive to the detecting means being in the particular condition.

5. Apparatus associated with a telephone line for automatically reporting when a predetermined condition occurs, the apparatus comprising:

means responsive to an occurrence of the predetermined condition for connecting to the telephone line;

means for thereafter calling a preselected station;

means for transmitting a coded signal, the coded signal being transmitted independent of signals received from the called station; and means responsive to signals received from the called station during only particular portions of the coded signal for transmitting a message to the called station apprising of the predetermined condition.

6. Apparatus associated with a telephone line comprising:

line termination means;

sound generating means;

means responsive to a ringing voltage across the telephone line for a predetermined period of time for connecting the line termination means across the line and energizing the sound generating means;

means for thereafter intermittently transmitting the sound produced by the sound generating means out on the telephone line to provide an interrupted audible signal having intervals of transmission and nontransmission;

bistable means for detecting responses to the audible signal during the nontransmission intervals, the bistable means only changing from one state to the other responsive to signals received during the nontransmission intervals; and means actuated when the bistable means is in a particular state at the end of a predetermined number of intervals.

7. Apparatus associated with a telephone line comprising:

line termination means;

means responsive to a ringing voltage across the telephone line for connecting the line termination means across the telephone line;

means for thereafter transmitting an interrupted signal out on the telephone line, the interrupted signal having intervals of transmission and nontransmission;

multistate means for detecting responses to the interrupted signal, the multistate means only changing state responsive to responses received during certain of the intervals; and means actuated only when the multistate means is in a particular state.

8. Apparatus associated with a telephone line comprising:

means responsive to a ringing voltage across the telephone line for answering an incoming call;

means for thereafter transmitting a coded signal out on the telephone line, the coded signal having at least three distinct portions;

means for detecting responses to the coded signal, the detecting means only responding to responses from the calling station, the detecting means being placed in a particular condition by the responses during certain of the portions of the coded signal; and means actuated when the detecting means is in the particular condition.

9. Apparatus associated with a telephone line comprising:

means responsive to the occurrence of a predetermined condition for connecting to the telephone line;

means for thereafter calling a preselected station;

means for transmitting a coded signal; and means actuated only in response to a particular signal received from the called station during at least one portion of the coded signal and the absence of the particular signal during at least one other portion of the coded signal.

10. Apparatus associated with a telephone line comprising:

means responsive to a ringing voltage across the telephone line for answering an incoming call and transmitting a coded signal to the calling station; and means actuated only in response to a particular signal received from the calling station during at least one portion of the coded signal and the absence of the particular signal during at least one other portion of the coded signal.

References Cited

UNITED STATES PATENTS

| | | | |
|---|---|---|---|
| 3,087,991 | 4/1963 | Anderson et al. | 179—5 |
| 3,188,392 | 6/1965 | Ferrell | 179—5 |
| Re. 26,099 | 10/1966 | Stoffels | 179—3 |
| 2,780,671 | 2/1957 | Thery | 179—5 |
| 3,166,641 | 1/1965 | Kreiner | 179—5 |

ROBERT L. GRIFFIN, *Primary Examiner.*

WILLIAM S. FROMMER, *Assistant Examiner.*

U.S. Cl. X.R.

179—2